United States Patent [19]

Waragai et al.

[11] Patent Number: 4,925,612
[45] Date of Patent: May 15, 1990

[54] METHOD FOR MAKING A THIN FILM OF POLYMER

[75] Inventors: Katsunori Waragai; Yukihiro Saito, both of Kawasaki; Shiro Asakawa, Tokyo, all of Japan

[73] Assignee: Matsushita Electric Industrial Co., Ltd., Osaka, Japan

[21] Appl. No.: 402,301

[22] Filed: Sep. 5, 1989

[30] Foreign Application Priority Data

Sep. 5, 1988 [JP] Japan .................. 63-221713

[51] Int. Cl.⁵ .................. B29C 41/12; B29C 41/24
[52] U.S. Cl. .................. 264/154; 264/166; 264/204; 264/216; 264/298; 427/289; 427/407.1; 427/412.1; 427/434.3
[58] Field of Search .................. 264/154, 165, 166, 204, 264/216, 298; 427/289, 402, 407.1, 412.1, 434.3

[56] References Cited

U.S. PATENT DOCUMENTS 4,192,842  3/1980  Kimura et al. .................. 264/298
4,279,855  7/1981  Ward, III .................. 264/298

FOREIGN PATENT DOCUMENTS 58-33086  7/1983  Japan .

Primary Examiner—Jeffery Thurlow
Assistant Examiner—Leo B. Tentoni
Attorney, Agent, or Firm—Lowe, Price, LeBlanc, Becker & Shur

[57] ABSTRACT

A method for making a polymer thin film wherein a first polymer thin film is formed on a support liquid, on which a solution of a second polymer is dropped is described. The first polymer film is pulled in opposite directions to break the first polymer film as a slit, from which the second polymer solution is cast on the support liquid. As a result, the solution can spread uniformly without involving any appreciable irregularity in thickness of a final film product.

5 Claims, 2 Drawing Sheets

METHOD FOR MAKING A THIN FILM OF POLYMER

BACKGROUND OF THE INVENTION

1. Field of the Invention

This invention relates to a method for making thin films of polymer which have wide utility as gas separation membranes, insulating films and resist films for semiconductor circuits.

2. Description of the Prior Art

For the formation of polymer thin films, there is known a method wherein a solution of a membrane material such as a polymer in volatile solvent is cast on a liquid surface, followed by evaporating the solvent to obtain a thin film of the polymer. This method is described, for example, in Japanese Patent Publication No. 58-33086 (corresponding to U.S. patent application Ser. No. 356,514, filed May 2, 1973, now abandoned).

In this known method, a polymer solution is dropped on the surface of a support liquid in an area sectioned between two movable solid partition members which are placed in parallel relation. After the dropping, the members are moved to widen the section, thereby more spreading the solution on the liquid surface. In this state, the solvent is allowed to evaporate thereby obtaining a thin film of the polymer.

The manner of the casting slightly differs depending upon the surface treatment of the solid partition members. The case where the solid partition member has been subjected to water-repellent treatment on the surface thereof is particularly shown in FIG. 3. In the figure, there is schematically shown a water vessel 11 in which a support liquid 12 such as water is placed. Indicated at 13 are water-repellent solid partition members and at 14 is a polymer solution being cast. Since the members 13 are water repellent in nature, the support liquid is repelled with the members 13 and becomes depressed at portions contacting the members 13. The polymer solution 14 is dropped at the depressed portion whereupon it is spontaneously spread.

On the contrary, the case using the members 13 having a hydrophilic surface is shown in FIG. 4, in which like reference numerals as in FIG. 3 indicate like parts or members. Since the members 13 are hydrophilic on the surfaces thereof, the meniscus becomes concave as shown in the figure, thereby forming a concave liquid surface between the members 13. The polymer solution 14 is dropped at the concave liquid surface and is spontaneously spread over the liquid surface.

According to our experiments, it was found that the contact of the polymer solution 14 with the members 13 placed a limit on the uniformity in thickness of the resulting film.

Moreover, when the hydrophilic members 13 are used, the polymer solution 14 is collected in the depressed portion of the concave liquid surface under which it is cast. Immediately after the casting, the monomolecular layer spreads at the interface with the support liquid 12, under which it becomes almost impossible to spread a thin film of the polymer.

A further disadvantage involved in the prior art methods is that the interface with the support liquid is disturbed by the impact caused by the dropping of the polymer solution, giving an adverse influence on the uniformity of film thickness.

SUMMARY OF THE INVENTION

It is accordingly an object of the invention to provide a method for making a thin film of polymer which has a uniform thickness throughout the film.

It is another object of the invention to provide a method for making a thin film of polymer wherein a polymer solution can be isotropically cast and spread, thereby forming a thin film with a uniform thickness.

The above objects can be achieved by a method which comprises:

casting a first polymer solution on the surface of a support liquid to form a first polymer thin film by evaporation of a solvent used;

placing a second polymer solution on part of the first polymer thin film; and breaking the first polymer thin film to make a slit in the first polymer thin film so that the second polymer solution on the part of the first polymer thin film is cast from the slit on the surface of the support liquid thereby forming a thin film of the second polymer.

DETAILED DESCRIPTION AND EMBODIMENTS OF THE INVENTION

The invention is characterized in that a polymer solution is placed or dropped on a film which has been previously cast and formed on the surface of a liquid support and the film is broken as a slit to cast the polymer solution on the liquid surface from the slit thereby forming a uniform thin film.

Figure 1:
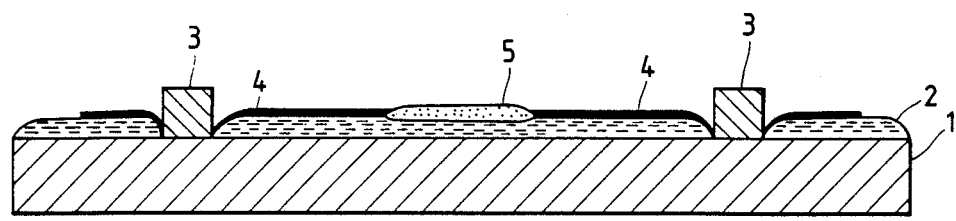
FIG. 1 is a schematic sectional view illustration an apparatus for carrying out a method for making a polymer thin film according to the invention.

Reference is now made to the accompanying drawings and particularly, to FIG. 1.

In the figure, there is shown an apparatus A for making a polymer thin film which includes a vessel or container 1 containing a support liquid 2 such as water and solid partition members 3. Indicated at 4 is a film initially formed on the liquid surface and at 5 is a polymer solution being cast.

In accordance with the method of the invention, a first polymer solution is cast on the support liquid 2 and allowed to stand for evaporation of a solvent used thereby forming a first film 4 on the liquid 2. Subsequently, the second polymer solution 5 whose polymer may be the same or different from the polymer used in the first polymer solution is placed or dropped on the first film 4.

In this condition, the solid partition members 3 which have been dropped on the first film 4 are pulled in opposite directions to tear or break the first film as a slit at the portion where the second polymer solution has been dropped. As a result, the second polymer is in contact with the liquid 2 and spreads over the exposed surface of the support liquid 2. When the members 3 are continued to be gently moved in the opposite directions, the slit is elongated and widened to increase an area of the exposed surface. More particularly, the first polymer thin film is continued to be pulled in the opposite directions while permitting the slit of the first polymer thin film to be gradually elongated and widened whereby the second polymer solution is isotropically cast on the support liquid. The members 3 may be moved to a desired extent, which depends on the intended film thickness of the second polymer. Thereafter, the solvent used in the second polymer solution is allowed to evaporate thereby obtaining a uniform thin film of the second polymer. The moving speed of the members 3 is not critical and is preferably at 1 to 10 cm/second for obtaining good results.

The method of the invention has several advantages that since the second polymer solution is not in contact with the partition members 3 during the casting, the resulting thin film has a more uniform thickness than in the case where the contact of a polymer solution with the partition members is essential. More particularly, in the known techniques where a polymer solution is directly dropped on the surface of a support liquid, the membrane material cannot be spread isotropically. This is because when dropped, the polymer solution spontaneously spreads, but when the partition members are moved away from each other, the dropped solution spreads only along the directions of the movement of the opposite partition members.

Further, with the partition members as used in the prior art method wherein they are treated hydrophobically, the members do not contact with the liquid surface uniformly. In the depressed section at the interface between the respective members and the liquid surface, there are portions where the polymer solution is more likely to be collected or gathered and where it is more unlikely to be collected. When the partition members are moved in opposite directions, the polymer solution will be made thicker at the likely portion and made thinner at the unlikely portion. This results in the irregularity of the film thickness.

In contrast, according to the method of the invention wherein the second polymer solution 5 is dropped on the previously formed film 4 and the film 4 is pulled in opposite directions, the polymer solution 5 does not enter the depressed portions established between the respective members 3 and the liquid. Thus, the irregularity of the film thickness as will occur in the prior art method is not produced.

The method of the invention is also advantageous in that since the solution 5 is not dropped on the liquid surface, the interface between the liquid and the solution is not disturbed by the impact of the dropping. The polymer solution 5 contacts with a fresh liquid surface which is exposed by the breakage of the film 4. This is also effective in reducing the influence of dust which would otherwise be on the liquid surface.

In addition, in case where the polymer solution 5 used has a specific gravity greater than the support liquid 2, the solution 5 does not settle down in the liquid 2. If such a solution 5 is dropped, it will be mixed with the support liquid 2 because of the higher specific gravity, thereby causing the resultant film to have an irregular thickness.

The polymers used in the first and second solutions may be any polymer which is useful as a thin membrane or film. Typical examples include various polyorganosiloxanes, olefinic polymers, cellulosic materials, polyalkylsulfones, nitrogen-containing polymers, 1-alkyne polymers and the like. The solvents for these polymers depend on the types of polymers used and may include aromatic hydrocarbons such as benzene, toluene and xylene, cycloaliphatic hydrocarbons such as cyclohexane, aliphatic hydrocarbons such as n-hexane, and halogenated hydrocarbons such as trichloroethylene, carbon tetrachloride and the like. The concentration of polymer in the first and second solutions is well known in the art and is generally in the range of from 0.5 to 5 wt %.

According to the method of the invention, a 100 to 1000 angstrom thick, uniform thin film is readily obtained.

Needless to say, the first polymer film may be formed by a known casting technique, and the second polymer film may be deposited on an appropriate support by any known technique.

The present invention is more particularly described by way of example.

EXAMPLE

A solution of 1 wt % of poly(1-trimethylsilyl-1-propyne) (hereinafter referred to simply as PMSP) in benzene was prepared. An apparatus as shown in FIG. 1 was used wherein ion-exchanged water was provided as a support liquid. Partition bars used had a 1 cm square section and was subjected to water-repellent treatment on the surfaces thereof. The ion-exchanged water was placed in a vessel so that it was raised from the vessel by the action of the surface tension. Thereafter, the partition bar was moved along the water surface from one end toward the other end to remove dust from the surface.

1 ml of the solution was cast over the water surface in an area of 30 cm in length and 30 cm in width.

The casing was effected by directly dropping the solution over the water surface for comparison. One the other hand, after formation of a film on the water surface similar to the comparison method, 1 ml of the solution was further dropped on the film, followed by tearing the film by pulling in opposite direction to form another film on the water surface according to the invention.

The films for comparison and of the invention had a thickness of about 200 angstroms.

These films were evaluated to determine irregularity in thickness thereof by two methods. In one method, the irregularity was visually observed as a gradation of the interference color of the film formed on the water surface. Another method was to measure gas permeability of each membrane.

As a result, it was found that the film for comparison has clear white color stripes in the film, thus having an irregular thickness. This was considered to result from the irregularity in amount of the solution which was dropped at the depressed portion established at the interface between the respective hydrophobic partition bars and the water surface. The solution present at a portion where it was likely to be built up spread in a concentric semi-circular form about the portion thereby forming stripes. Since these stripes reflected on the thickness irregularity, the portion between two adjacent stripes became thin and was apt to break thereat.

When the PMSP solution was dropped on the previously formed PMSP film and the film was torn by pulling, the PMSP solution spread along the direction of the tear slit and also along the movement of the partition bars. In this state, no depression where the solution was likely to be collected was present. Thus, no concentric gradation took place.

The uniformity in thickness of the respective films was also evaluated by measurement of oxygen and nitrogen permeabilities.

The PMSP films for comparison and of the invention were, respectively, disposed on a polyester sulfone porous support in one layer. The gas permeation rate per 10 cm$^2$ of the respective membranes was measured for nitrogen and oxygen in such a way that a pressure of 1 kg/cm$^2$ was imposed from the side of the PMSP film.

The measurement was made at different ten portions of each membrane.

Figure 2:
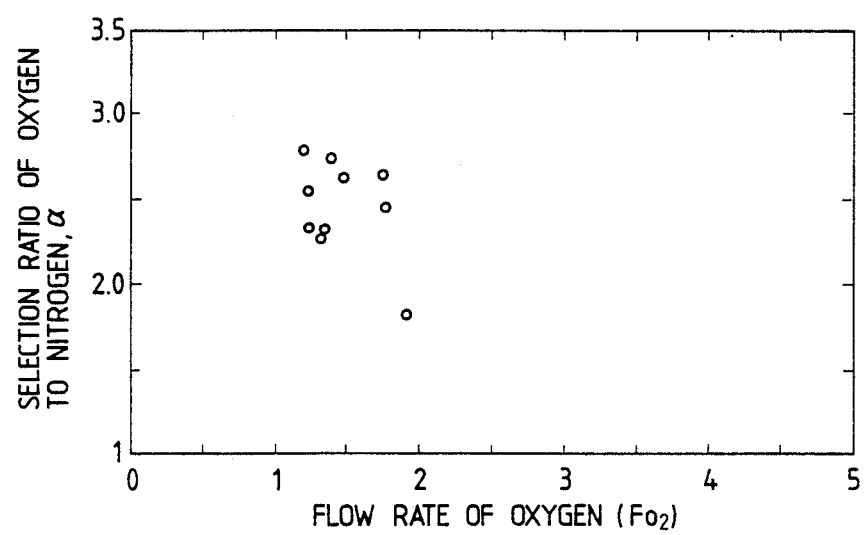
FIG. 2 is a graphical representation of a gas permeation characteristic of a membrane of poly(1-trimethylsilyl-1-propyne) made according to the invention.
Figure 3:
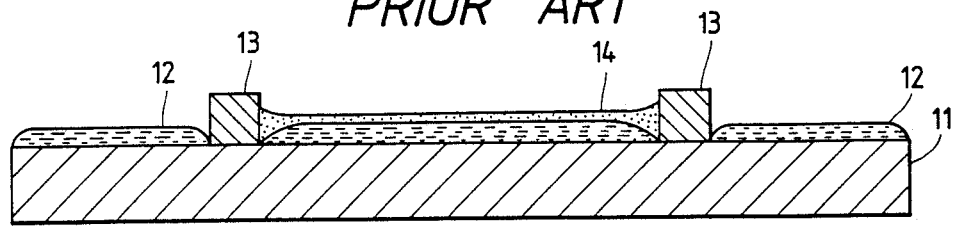
FIGS. 3 and 4 are, respectively, schematic sectional views of apparatus for carrying out known methods of making a polymer thin film.
Figure 4:
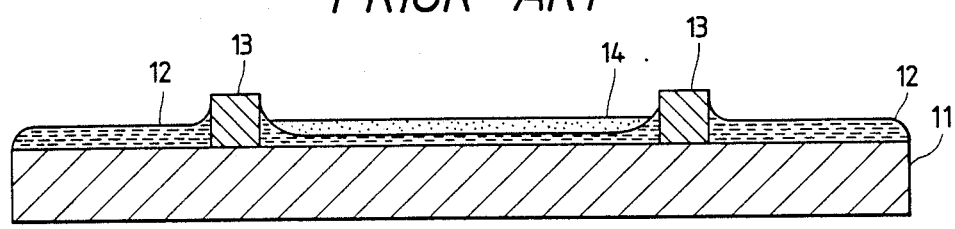
Figure 5:
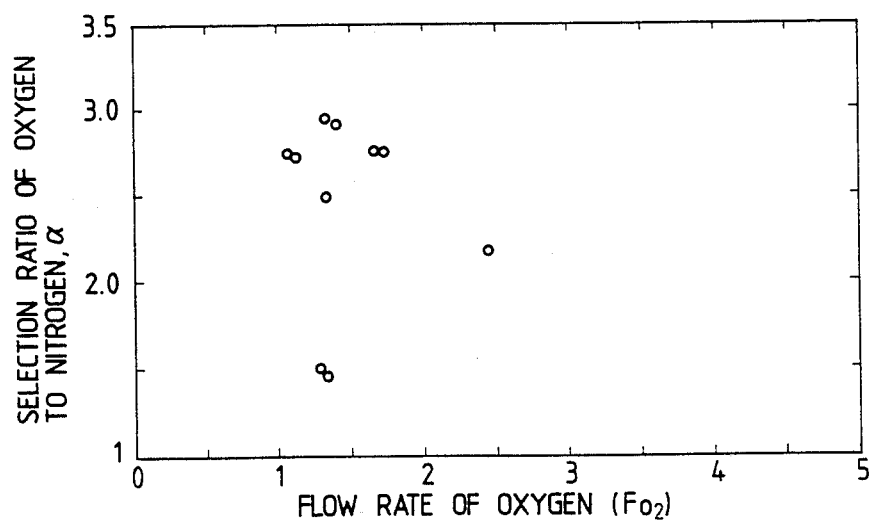
FIG. 5 is a graphical representation of a gas permeation characteristic of a membrane of poly(1-trimethylsilyl-1-propyne) made according to a known method.

The results are shown in FIGS. 2 and 5 for the membrane of the invention and for the comparative membrane, respectively. In these figures, there is shown the relation between the flow rate of oxygen, $F_{O2}$, and the selection ratio of oxygen to nitrogen, $\alpha = F_{O2}/F_{N2}$. From FIGS. 2 and 5, it will be seen that the membrane obtained by the known method are more dispersed with respect to the gas permeability at different portions of the film than the membrane obtained according to the invention.

What is claimed is:

1. A method for making a thin film of polymer which comprises:

casting a first polymer solution on a surface of a support liquid to form a first polymer thin film by evaporation of a solvent used;

placing a second polymer solution on part of the first polymer thin film; and breaking the first polymer thin film to make a slit in the first polymer thin film so that the second polymer solution on the part of the first polymer thin film is cast from the slit on the surface of the support liquid thereby forming a thin film of the second polymer.

2. A method according to claim 1, wherein the polymer used in the first polymer solution is the same as the polymer used in the second polymer solution.

3. A method according to claim 1, wherein the polymer used in the first polymer solution is different from the polymer used in the second polymer solution.

4. A method according to claim 1, wherein the slit in the first polymer film is made by pulling the first polymer thin film in opposite directions.

5. A method according to claim 1, wherein the first polymer thin film is continued to be pulled in the opposite directions while permitting the slit to be gradually elongated and widened whereby the second polymer solution is isotropically cast on the support liquid.

* * * * *